US012586887B2

(12) United States Patent
Yoo et al.

(10) Patent No.: US 12,586,887 B2
(45) Date of Patent: Mar. 24, 2026

(54) BROADBAND TRANSITION STRUCTURE WITH MIXED CONTACT AND NON-CONTACT PROTRUSIONS

(71) Applicant: HJWAVE Co., Ltd., Seongnam-si (KR)

(72) Inventors: Tae Hwan Yoo, Incheon (KR); Sung Hwan Kim, Gwangmyeong-si (KR)

( * ) Notice: Subject to any disclaimer, the term of this patent is extended or adjusted under 35 U.S.C. 154(b) by 55 days.

(21) Appl. No.: 18/389,844

(22) Filed: Dec. 20, 2023

(65) Prior Publication Data

US 2024/0213645 A1 Jun. 27, 2024

(30) Foreign Application Priority Data

Dec. 21, 2022 (KR) ........................ 10-2022-0180815
Dec. 19, 2023 (KR) ........................ 10-2023-0186208

(51) Int. Cl.
*H01P 3/12* (2006.01)
*H01P 3/123* (2006.01)

(52) U.S. Cl.
CPC .............. *H01P 3/121* (2013.01); *H01P 3/123* (2013.01)

(58) Field of Classification Search
CPC .......... H01P 5/024; H01P 3/123; H01P 1/042; H01P 3/121
See application file for complete search history.

(56) References Cited

U.S. PATENT DOCUMENTS

| | | | | |
|---|---|---|---|---|
| 11,088,464 | B2 * | 8/2021 | Sato | H01Q 21/064 |
| 11,114,733 | B2 * | 9/2021 | Doyle | H01Q 21/0043 |
| 2017/0187124 | A1 * | 6/2017 | Kirino | H01Q 1/3266 |
| 2018/0301817 | A1 * | 10/2018 | Ichinose | G01S 13/931 |
| 2019/0123411 | A1 * | 4/2019 | Carlred | H01P 5/024 |
| 2023/0223671 | A1 * | 7/2023 | Vosoogh | H01P 3/085 333/204 |

OTHER PUBLICATIONS

Vosoogh Abbas et al: "Zero-Gap Waveguide: A Parallel Plate Waveguide With Flexible Mechanical Assembly for mm-Wave Antenna Applications", Dec. 1, 2018, XP011702137.

* cited by examiner

*Primary Examiner* — Quan Tra
*Assistant Examiner* — Anh-Quan Tra
(74) *Attorney, Agent, or Firm* — ANTONIO HA & U.S. PATENT, LLC

(57) ABSTRACT

Provided is the broadband transition structure with mixed contact and non-contact protrusions having a first substrate and a second substrate which are adjacent to each other and transmitting a radio wave through a waveguide, in which the first substrate comprises a flat first side, a second side opposite to the first side, a first waveguide provided between the first side and the second side, a third side provided between the first side and the second side as a periphery of the first waveguide, a fourth side connecting the first side and the third side, a plurality of contact protrusions extending from the third side and contacting the second substrate, and a plurality of non-contact protrusions extending from the third side and non-contacting the second substrate.

7 Claims, 7 Drawing Sheets

BROADBAND TRANSITION STRUCTURE WITH MIXED CONTACT AND NON-CONTACT PROTRUSIONS

CROSS-REFERENCE TO RELATED APPLICATION(S)

This application claims priority to Korean Patent Application Nos. 10-2022-0180815, filed on Dec. 21, 2022, and 10-2023-0186208, filed on Dec. 19, 2023, in the Korean Intellectual Property Office, the disclosures of which are incorporated by reference herein in their entireties.

TECHNICAL FIELD

The present disclosure relates to a broadband transition structure with mixed contact and non-contact protrusions.

DISCUSSION OF RELATED ART

Corner radar must have wide-angle characteristics to detect objects at intersections (for example, Azimuth field of view: 150 degrees or more) and high resolution to detect small objects, requiring broadband characteristics (for example, bandwidth: 5 GHz or higher).

In order to provide these characteristics, the antenna itself must be able to satisfy both wide-angle characteristics and broadband characteristics. However, antennas applied to radars that are currently on the market as commercial products cannot provide both wide-angle and broadband characteristics and can only provide one of the wide-angle or broadband characteristics.

The antenna used in current automotive radars is formed in a copper pattern on a multi-layer printed circuit board (PCB), and the antenna feeder may be directly connected to the radar monolithic microwave integrated circuit (MMIC).

However, PCB-type antennas have limitations in their own broadband/wide-angle performance, so there is a trend toward developing radars using waveguide-type antennas. In the waveguide type antenna, the radar module and antenna are separated from each other. Therefore, a transition unit is required for radio wave transmission between the antenna and the module.

Regarding this transition unit, the radar module has a multi-layer structure, so the back cavity transition unit, which is applicable to a general single PCB, cannot be applied, so a new structure of the waveguide-PCB transition unit applicable to multi-layers is needed.

The information disclosed in the background of the present disclosure is only for improving understanding of the background of the present disclosure and therefore may include information that does not constitute prior art.

SUMMARY

The purpose of the present disclosure is to provide a broadband transition structure with mixed contact and non-contact protrusions that support broadband and wide angle that can simultaneously satisfy the broadband and wide-angle characteristics applicable to radar.

According to the present disclosure, the broadband transition structure with mixed contact and non-contact protrusions may have a first substrate and a second substrate which are adjacent to each other and transmit a radio wave through a waveguide, in which the first substrate may comprise a flat first side, a second side opposite to the first side, a first waveguide provided between the first side and the second side, a third side provided between the first side and the second side as a periphery of the first waveguide, a fourth side connecting the first side and the third side, a plurality of contact protrusions extending from the third side and contacting the second substrate, and a plurality of non-contact protrusions extending from the third side and non-contacting the second substrate.

In some examples, the height of the contact protrusion may be higher than the height of the non-contact protrusion.

In some examples, the height of the contact protrusion may be equal to the height of the fourth side, and the height of the non-contact protrusion may be less than the height of the fourth side.

In some examples, the contact protrusion or the non-contact protrusion may be disposed within $\lambda/4$ from the first waveguide.

In some examples, the contact protrusion or the non-contact protrusion may be provided periodically or aperiodically on the third side.

In some examples, the height of the contact protrusion or the non-contact protrusion may be higher than $\lambda/4$.

In some examples, the height difference between the contact protrusion and the non-contact protrusion is within ⅓ of the height of the contact protrusion.

The present disclosure may provide a broadband transition structure with mixed contact and non-contact protrusions that support broadband and wide angle that can simultaneously satisfy the broadband and wide-angle characteristics applicable to radar.

DETAILED DESCRIPTION

Figure 1:
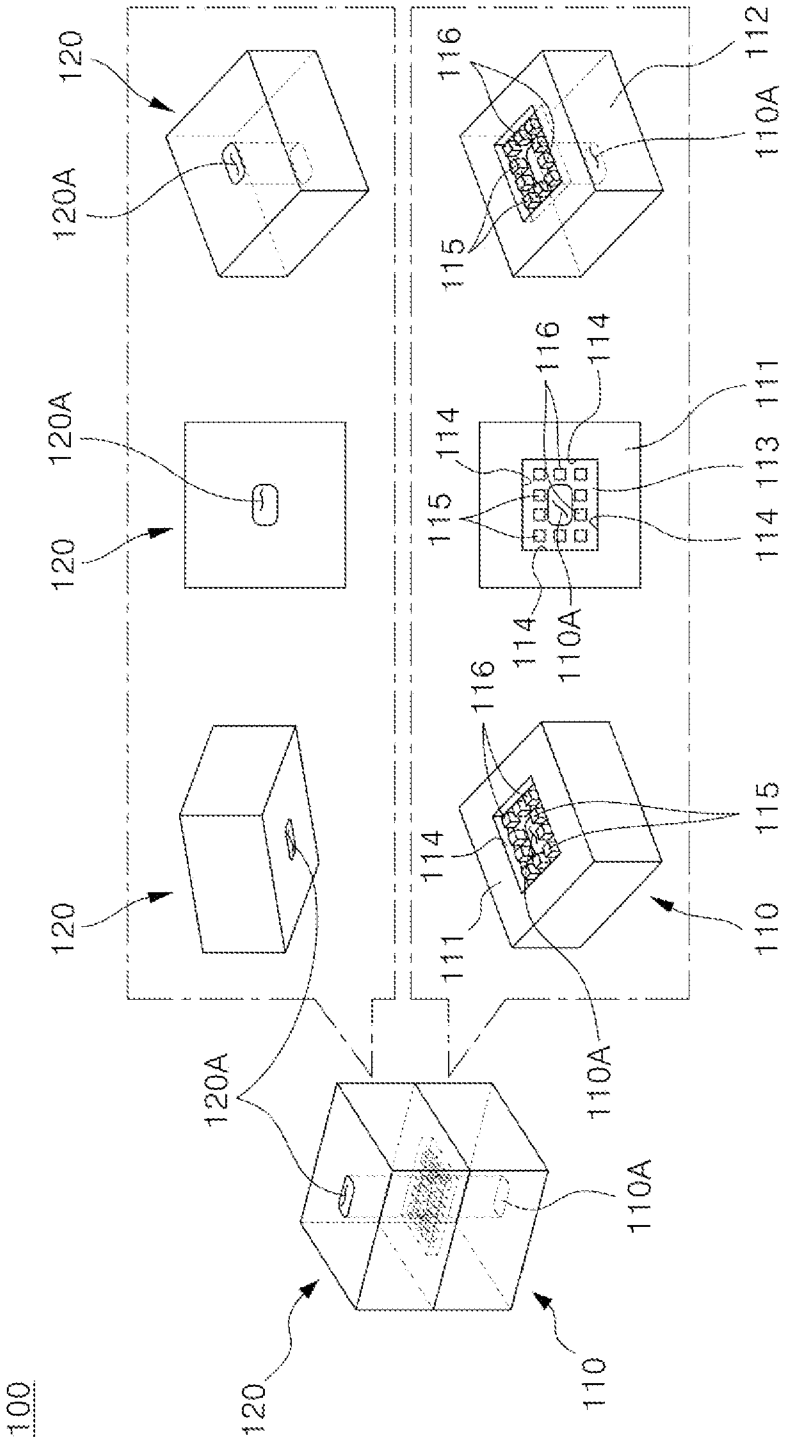
FIG. 1 is a view showing a broadband transition structure with mixed contact and non-contact protrusions according to the present disclosure.

Hereinafter, preferred embodiments according to the present disclosure are described in detail with reference to the accompanying drawings.

The present disclosure is provided to more completely explain the present disclosure to those skilled in the art, and the following examples may be modified into various other forms, and the scope of the present disclosure is not limited to the following examples. Rather, these examples make the disclosure more complete and is provided in order to completely convey the spirit of the present disclosure to those skilled in the art.

Further, in the following drawings, the thickness and size of each layer are exaggerated for convenience and clarity of description, and the same symbols in the drawings refer to the same elements. As used herein, the term "and/or" includes any one and all combinations of one or more of the listed items. Further, as used herein, the term "connected" refers not only to the case where member A and member B are directly connected, but also to the case where member C is interposed between member A and member B to indirectly connect member A and member B.

The terms used herein are used to describe specific embodiments and are not intended to limit the invention. As used herein, the singular forms include the plural forms unless the context clearly indicates otherwise. Additionally, as used herein, the terms "comprise, include," and/or "comprising, including" specify the presence of stated shapes, numbers, steps, operations, members, elements and/or groups thereof but is not intended to exclude the presence or addition of one or more other shapes, numbers, operations, members, elements and/or groups thereof.

As used herein, the terms "first," "second," etc. are used to describe various members, parts, regions, layers and/or portions, but it is obvious that these members, parts, regions, layers and/or parts should not be limited by these terms. These terms are used only to distinguish one member, component, region, layer or portion from another member, component, region, layer or portion. Accordingly, a first member, component, region, layer or portion described below may refer to a second member, component, region, layer or portion without departing from the teachings of the present disclosure.

Space-related terms such as "beneath," "below," "lower," "above," and "upper" may be used to facilitate understanding of one element or feature and another element or feature shown in the drawings. These space-related terms are for easy understanding of the present disclosure according to various process states or usage states of the present disclosure and are not intended to limit the present disclosure. For example, if an element or feature in a drawing is inverted, an element or feature described as "beneath" or "below" becomes "above" or "upper." Therefore, "below" is a concept encompassing "above" or "below."

FIG. 1 is a view showing a broadband transition structure 100 with mixed contact and non-contact protrusions according to the present disclosure.

For easy understanding, the broadband transition structure 100 with mixed contact and non-contact protrusions according to the present disclosure is described from various angles in FIG. 1.

As shown in FIG. 1, the broadband transition structure 100 according to the present disclosure may include a first substrate 110 and a second substrate 120 coupled to each other to transition radio waves through waveguides 110A and 120A.

The first substrate 110 may include a first waveguide 110A, and the second substrate 120 may include a second waveguide 120A. The first and second waveguides 110A and 120A and the first and second substrates 110 and 120 may be coupled to each other.

The first and second substrates 110 and 120 may both be conductors. In some examples, the first and second substrates 110 and 120 are insulators, but all surfaces exposed to the air may be coated with a conductor.

The diameters of the first and second waveguides 110A and 120A may be the same or similar to each other.

The first substrate 110 may be referred to as a waveguide structure, and the second substrate 120 may be referred to as a printed circuit board, and vice versa. Of course, the first and second substrates 110 and 120 may be referred to in various ways other than these names.

The technical features of the present disclosure are mainly in the first substrate 110, so that the first substrate 110 is mainly described below.

The first substrate 110 may include the first side 111, the second side 112, the first waveguide 110A, the third side 113, the fourth side 114, the plurality of contact protrusions 115, and the plurality of non-contact protrusions 116.

The first side 111 may be approximately flat or completely flat and may be in close contact with or spaced apart from one surface of the second substrate 120. The first side 111 may be spaced apart from the surface of the second substrate 120 according to various tolerances during the manufacturing process or mass production or may be designed to be intentionally spaced apart.

When the first side 111 is separated from the surface of the second substrate 120, the contact protrusion 115 may support the separation by being in close contact with the second substrate 120.

Meanwhile, when the first side 111 is separated from the surface of the second substrate 120, an additional support structure (not shown) supporting the separation is located at a corner or part of the first substrate 110 in addition to the contact protrusion 115 so that the first substrate 110 and the second substrate 120 may be coupled to each other. In this case, the plurality of contact protrusions 115 may protrude higher than the first side 111 and may protrude to the same height as the additional support structure.

The second side 112 may be the opposite side of the first side 111 and may be approximately flat or completely flat. As will be described later, a structure constituting a radar and an antenna may be additionally formed on the second side 112, or various component parts may be attached. For example, a waveguide and a transition structure connected to the first waveguide 110A may be formed on the surface of the second side 112, or a separate third substrate 130 to be described later for emitting and receiving radio waves may be formed on the second side 112.

The first waveguide 110A may be provided between the first side 111 and the second side 112. Further, the first waveguide 110A may penetrate the first side 111 and the second side 112. The first waveguide 110A may be rectangular or approximately rectangular with rounded corners when viewed from a plan view. As described above, radio waves may be transitioned through the first waveguide 110A to the second waveguide 120A or vice versa.

The third side 113 may be provided between the first side 111 and the second side 112 as a periphery of the first waveguide 110A. At this time, the third side 113 may be provided by performing an engraving process on the first side 111.

The third side 113 is formed lower than the first side 111. At this time, the third side 113 may be approximately rectangular when viewed from a plan view. Meanwhile, the first waveguide 110A may be disposed approximately at the center of the third side 113. Substantially, the first waveguide 110A may penetrate the third side 113 and the second side 112.

The fourth side 114 may connect the first side 111 and the third side 113. Substantially, the fourth side 114 may be a wall or side wall provided around the third side 113. The fourth side 114 may be approximately parallel to the inner wall of the first waveguide 110A.

In FIG. 1, the third side 113 is shown to have a size that surrounds the first waveguide 110A and the contact/non-contact protrusions 115 and 116, but it is not limited to this, and the area of the third side 113 may be larger than those areas. In this case, the first side 111 may be concentrated at the corner of the first side 110.

The plurality of contact protrusions 115 may extend from the third side 113 to contact the lower surface of the second substrate 120. At this time, the contact protrusion 115 may have a substantially square, rectangular, pentagonal, hexagonal, or circular pillar shape. The wall side of the contact protrusion 115 may be substantially parallel to the fourth side 114 and the inner wall of the first waveguide 110A.

The plurality of non-contact protrusions 116 may extend from the third side 113 to non-contact the second substrate 120. At this time, the non-contact protrusion 116 may be approximately square, rectangular, pentagonal, hexagonal, or circular pillar shape. The wall side of the non-contact protrusion 116 may be substantially parallel to the fourth side 114 and the inner wall of the first waveguide 110A.

Meanwhile, the contact protrusion 115 and the non-contact protrusion 116 may be identical or similar in shape or form except for height.

The non-contact protrusions 116 may be disposed between the contact protrusions 115, or the contact protrusions 115 may be disposed between the non-contact protrusions 116. The number of contact protrusions 115 may be greater than or equal to the number of non-contact protrusions 116. In some examples, the number of non-contact protrusions 116 may be greater than or equal to the number of contact protrusions 115. Of course, the arrangement and number of the contact protrusions 115 and non-contact protrusions 116 are not limited to any specific shape and may be determined in various ways depending on the environment and design method.

The height (or thickness) of the contact protrusion 115 may be higher than the height (or thickness) of the non-contact protrusion 116, and the height (or thickness) of the non-contact protrusion 116 may be smaller than the height (or thickness) of the contact protrusion 115.

Further, the height (or thickness) of the contact protrusion 115 may be approximately equal to the height (or top and bottom height) of the fourth side 114. The height (or thickness) of the non-contact protrusion 116 may be approximately smaller than the height (or top and bottom height) of the fourth side 114.

Meanwhile, the number of contact protrusions 115 and/or non-contact protrusions 116 may be approximately 4 to approximately 20. When the number of contact protrusions 115 and/or non-contact protrusions 116 is less than approximately 4, the loss value due to the space between the first substrate 110 and the second substrate 120 may be greater than the reference value. When the number of contact protrusions 115 and/or non-contact protrusions 116 is greater than approximately 20, the loss value no longer improves due to the space between the first substrate 110 and the second substrate 120.

In some examples, the contact protrusion 115 and/or the non-contact protrusion 116 may be disposed at a distance within approximately $\lambda/4$ from the first waveguide 110A. When the contact protrusion 115 and/or the non-contact protrusion 116 are disposed at a distance greater than approximately $\lambda/4$ from the first waveguide 110A, the loss value depending on the space between the first substrate 110 and the second substrate 120 may be greater than the reference value.

In some examples, the contact protrusions 115 and/or non-contact protrusions 116 may be arranged periodically on third side 113. In some examples, the contact protrusions 115 and/or non-contact protrusions 116 may be arranged aperiodically on the third side 113.

In some examples, the height of contact protrusion 115 and/or non-contact protrusion 116 may be greater than approximately $\lambda/4$. When the height of the contact protrusion 115 and/or the non-contact protrusion 116 is less than approximately $\lambda/4$, the loss value due to the space between the first substrate 110 and the second substrate 120 may be greater than the reference value. In some examples, the height of contact protrusion 115 and/or non-contact protrusion 116 may be approximately 1.2 mm to approximately 1.4 mm. When the height of the contact protrusion 115 and/or the non-contact protrusion 116 is less than approximately 1.2 mm to approximately 1.4 mm, the loss value due to the space between the first substrate 110 and the second substrate 120 may be greater than the reference value. In some examples, the height of contact protrusion 115 or non-contact protrusion 116 may be approximately $0.307\lambda$ to approximately $0.358\lambda$. When the height of the contact protrusion 115 or the non-contact protrusion 116 is less than approximately $0.307\lambda$ to approximately $0.358\lambda$, the loss value due to the space between the first substrate 110 and the second substrate 120 may be greater than the reference value.

In some examples, the height difference between the contact protrusion 115 and the non-contact protrusion 116 may be within approximately ⅓ of the height of the contact protrusion 115. In some examples, the height of non-contact protrusion 116 may be greater than approximately 0.5 mm. When it is outside this range, the loss value due to the space between the first substrate 110 and the second substrate 120 may be greater than the reference value.

Figure 2:
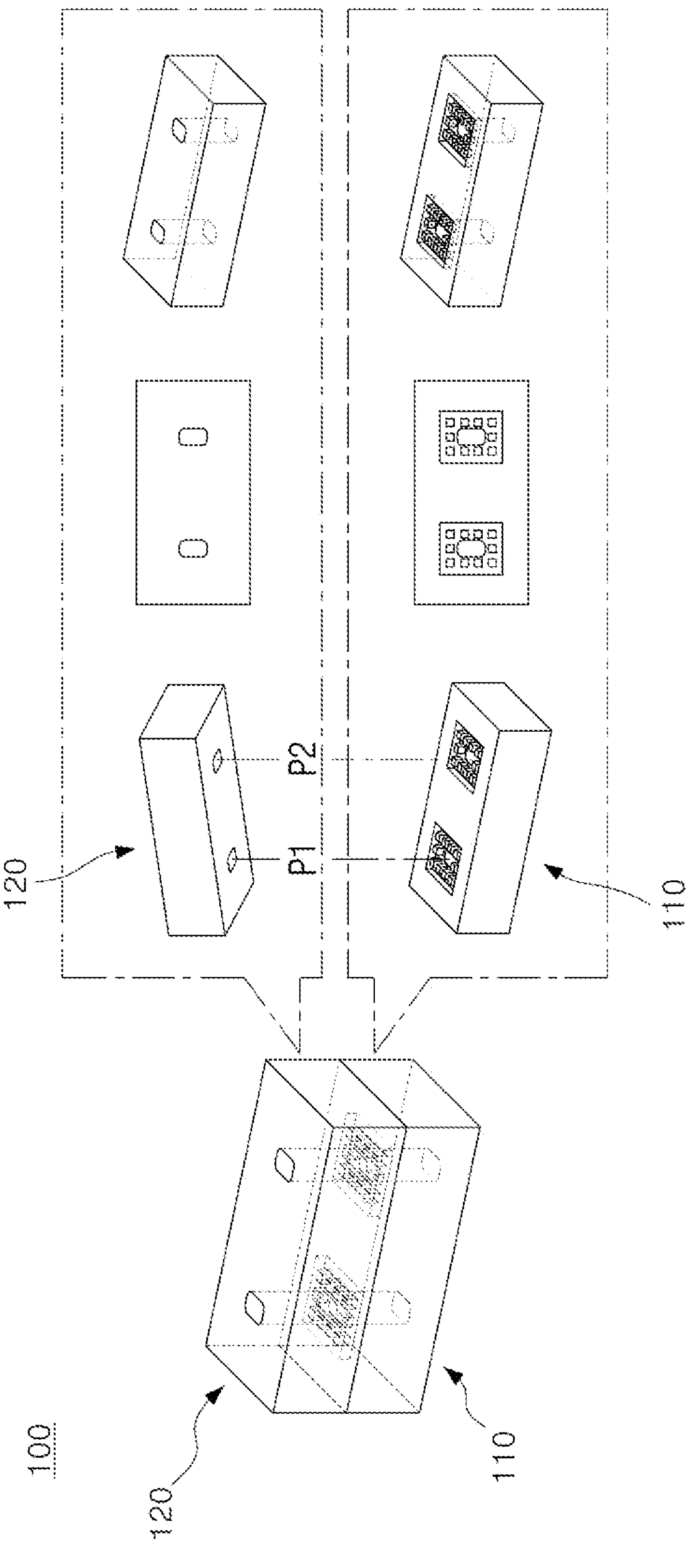
FIG. 2 is a view illustrating that a plurality of waveguides are provided in the broadband transition structure according to the present disclosure.

FIG. 2 is a view illustrating that a plurality of the broadband transition structure according to the present disclosure are provided. As shown in FIG. 2, the broadband transition structures may be provided with ports P1 and P2 spaced apart. That is, the broadband transition structure 100 described above may be provided to the first port P1, and the broadband transition structure 100 described above may be provided to the second port P2 spaced apart from the first port P1. Although two ports P1 and P2 are shown in FIG. 2, of course, three or more ports may be provided spaced apart from each other.

In FIG. 2, each port is shown as having one waveguide within a rectangular well with contact protrusions and non-contact protrusions surrounding it. However, a plurality of waveguides may be arranged spaced apart within one large rectangular well, and contact protrusions and non-contact protrusions may surround each spaced waveguide.

Figure 3:
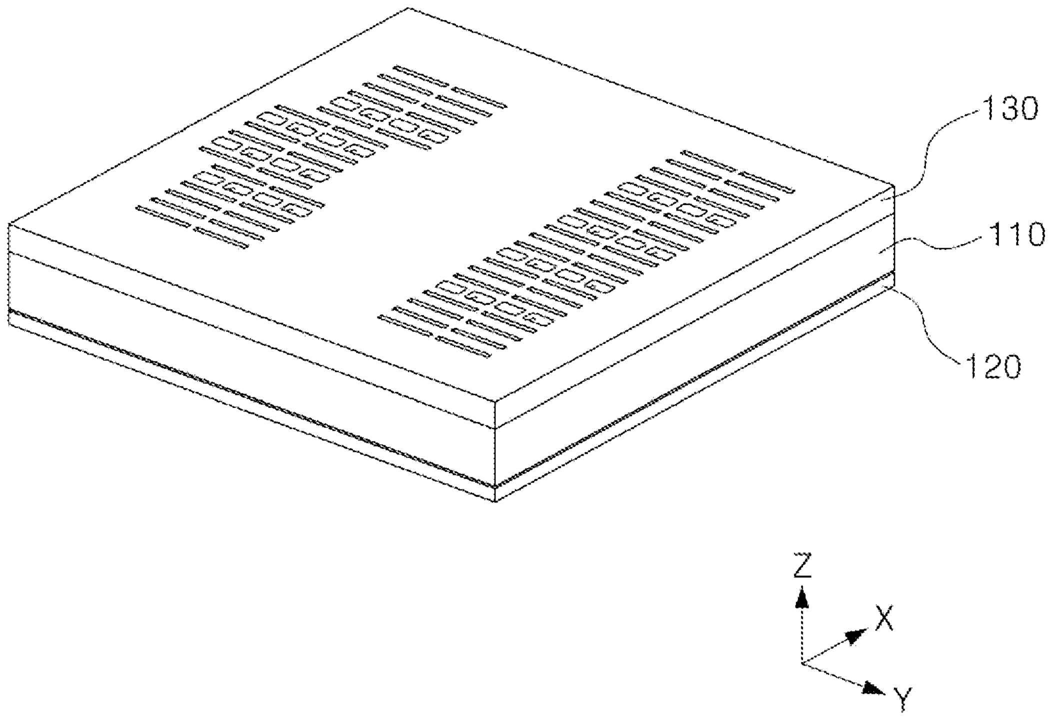
FIG. 3 is a view illustrating a multi-layer antenna structure including a broadband transition structure according to the present disclosure as viewed from the upper side of the third substrate.
Figure 4:
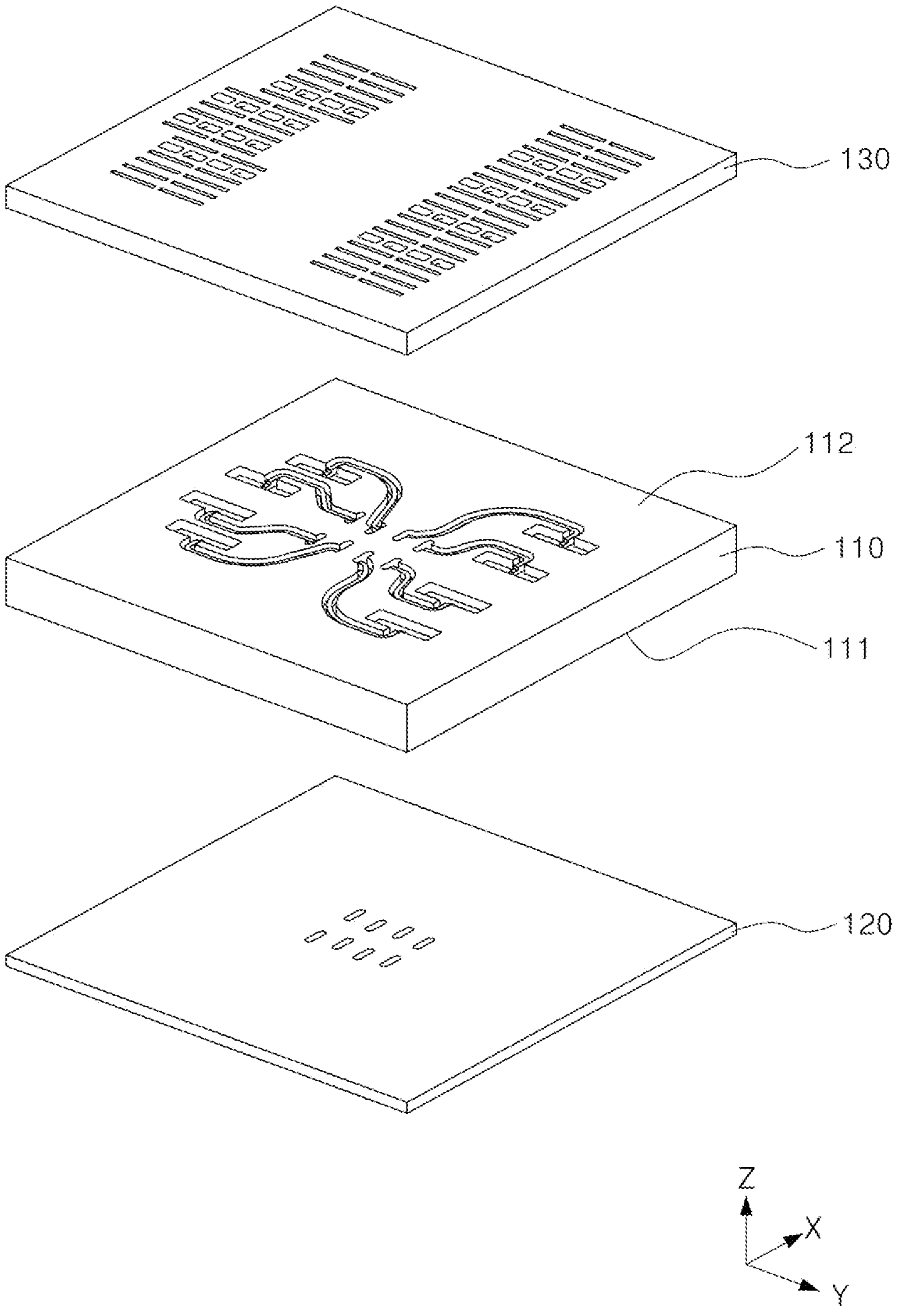
FIG. 4 is a view illustrating a multi-layer antenna structure including a broadband transition structure according to the present disclosure as viewed from the lower side of the second substrate.
Figure 5:
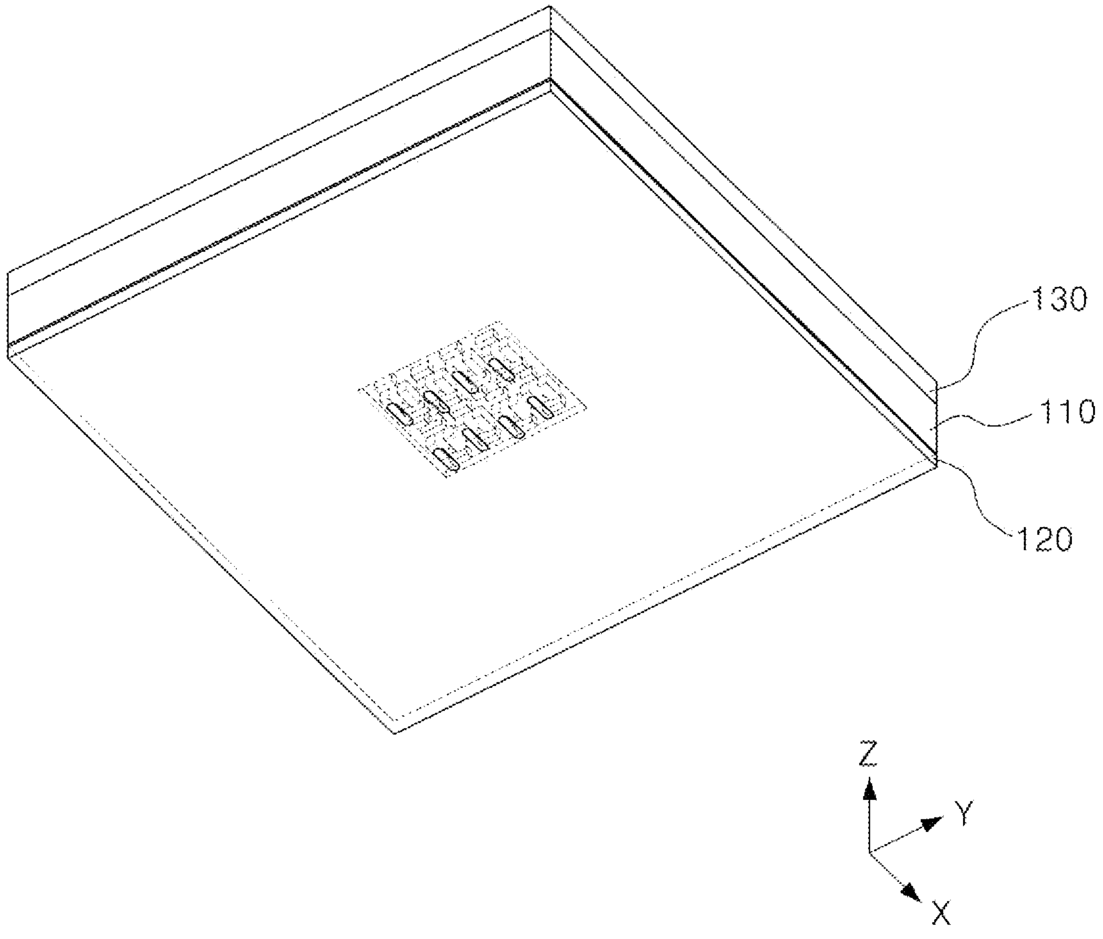
FIG. 5 is a view illustrating an exploded view of each layer of a multi-layer antenna including a broadband transition structure according to the present disclosure, viewed from the upper side of the third substrate.
Figure 6:
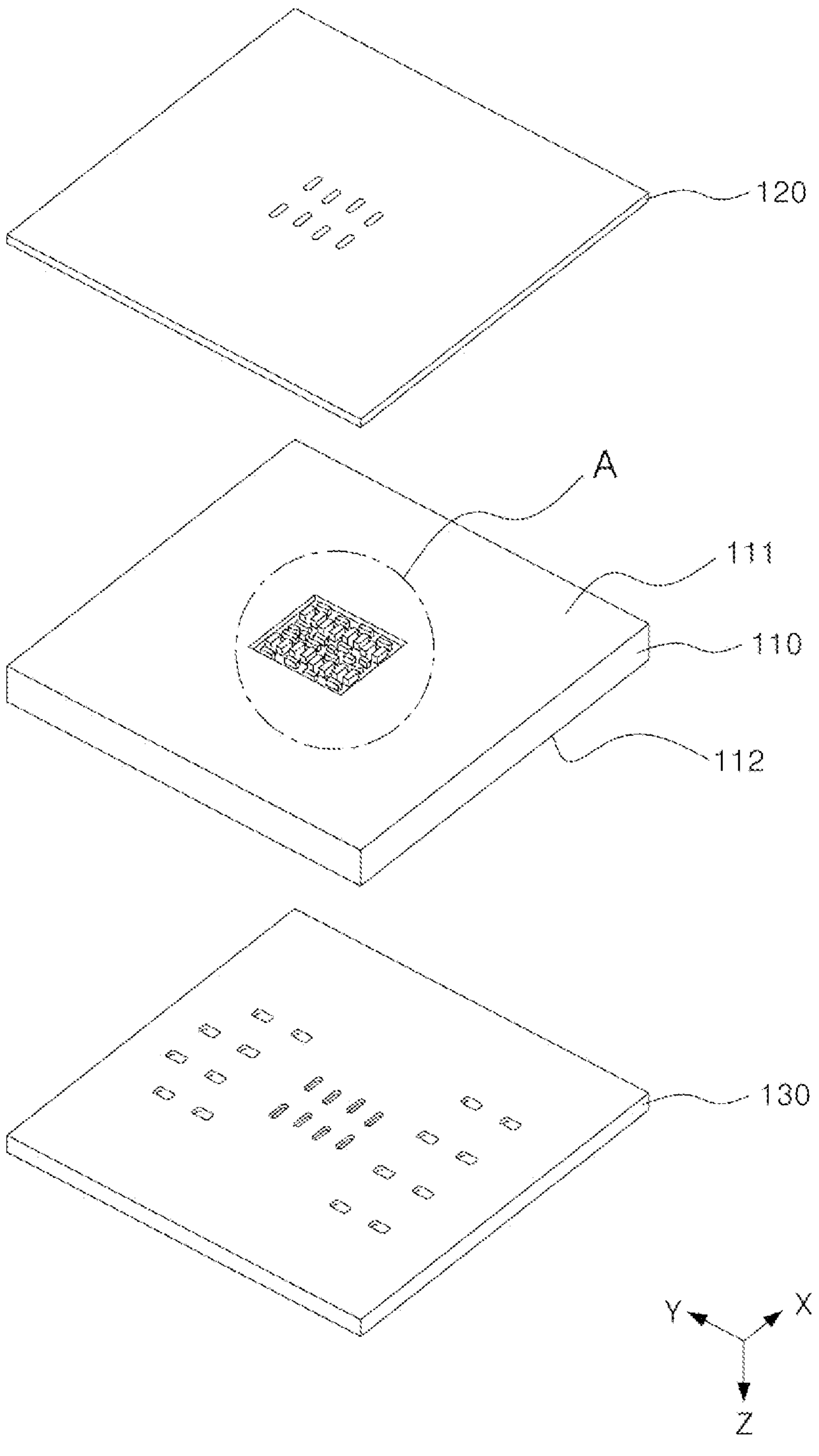
FIG. 6 is a view illustrating an exploded view of each layer of a multi-layer antenna including a broadband transition structure according to the present disclosure, viewed from the lower side of the second substrate.

FIG. 3 is a view illustrating a multi-layer antenna structure including a broadband transition structure according to the present disclosure as viewed from the upper side of the third substrate, FIG. 4 is a view illustrating a multi-layer antenna structure including a broadband transition structure according to the present disclosure as viewed from the lower side of the second substrate, FIG. 5 is a view illustrating an exploded view of each layer of a multi-layer antenna including a broadband transition structure according to the present disclosure, viewed from the upper side of the third substrate, and FIG. 6 is a view illustrating an exploded view of each layer of a multi-layer antenna including a broadband transition structure according to the present disclosure, viewed from the lower side of the second substrate.

The multi-layer antenna structure shown in FIGS. 3 to 6 includes the first substrate 110, the second substrate 120, and the third substrate 130 coupled to each other.

The first substrate 110 may be disposed between the second substrate 120 and the third substrate 130 and may be a substrate forming a broadband transition structure with mixed contact and non-contact protrusions according to an embodiment of the present disclosure.

Referring to FIGS. 5 and 6, the first substrate 110 may include the first side 111, the first waveguide 110A, the third side 113, and the fourth side 114, the plurality of contact protrusions 115, and the plurality of non-contact protrusions 116 in the portion coupled to the second substrate 120 and may include the first waveguide 110A and a waveguide connected thereto in a portion coupled to the third substrate 130.

The second substrate 120 may be a printed circuit board (PCB), and an antenna slot pattern for radiation and reception of radio waves may be formed on the third substrate 130.

Figure 7:
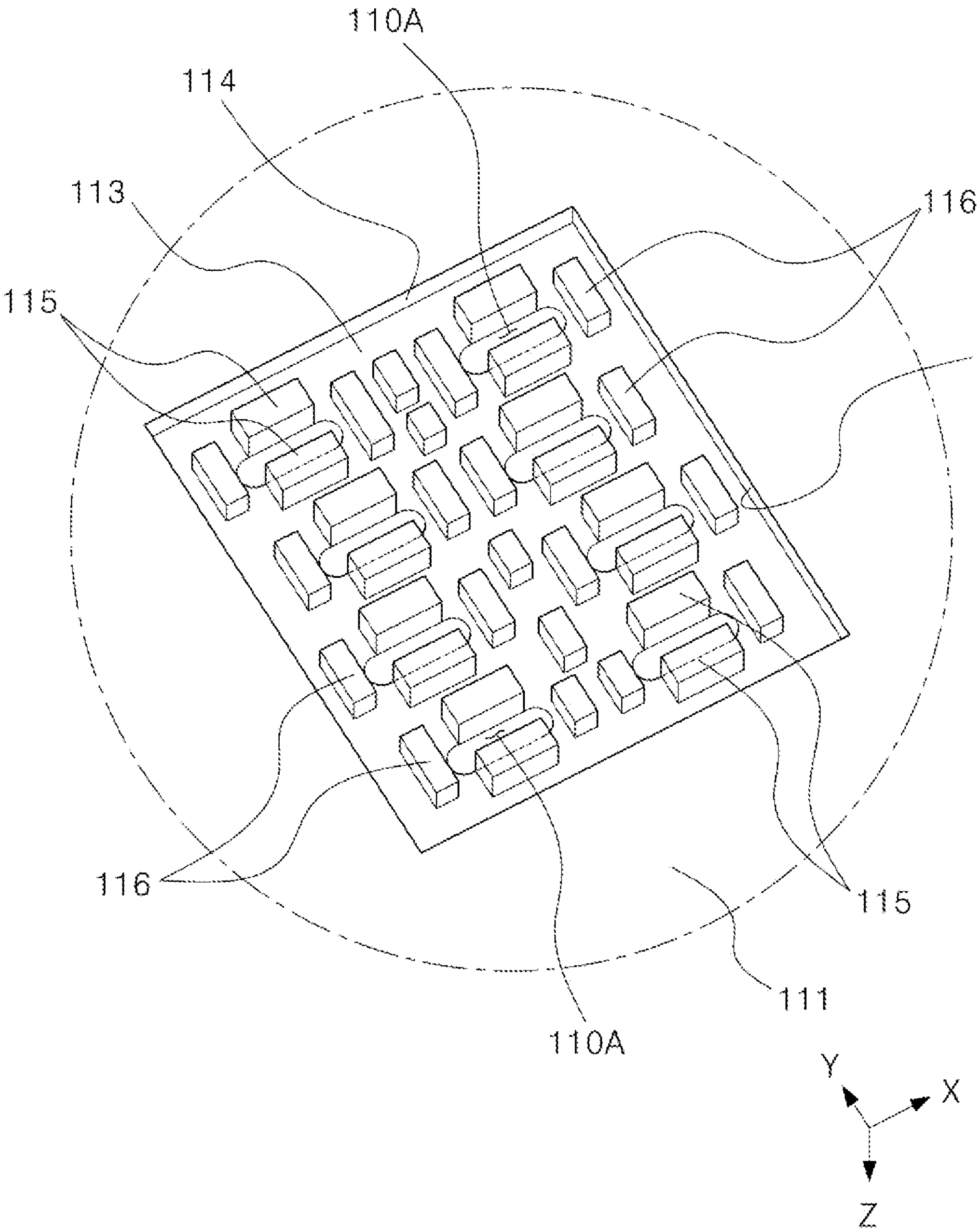
FIG. 7 is an enlarged view of area A of FIG. 6.

FIG. 7 is an enlarged view of area A of FIG. 6 and explains the peripheral portion of the first waveguide. FIG. 7 shows a broadband transition structure with mixed contact and non-contact protrusions, and descriptions that overlap with those described in FIGS. 1 and 2 are excluded.

In the embodiment of FIG. 7, the plurality of first waveguides 110A may be provided on the third side 113, and the fourth side 114 may connect the first side 111 and the third side 113. Unlike the first waveguides 110 formed in each well as shown in FIG. 2 described above, in the embodiment of FIG. 7, a plurality of first waveguides 110A may be disposed in one large rectangular well, and contact protrusions 115 and non-contact protrusions 116 surround each first waveguide 110A.

In the embodiments of FIGS. 1 and 2, five or more contact protrusions 115 and non-contact protrusions 116 may surround the first waveguide 110A, but in the embodiment of FIG. 7, a total of four protrusions 115 and 116, including two contact protrusions 115 and two non-contact protrusions 116, may surround the first waveguide 110A. As described above, the number of contact protrusions 115 and non-contact protrusions 116 surrounding the first waveguide 110A is not limited to the example in the drawing, and at least four or more protrusions 115 and 116 may surround the first waveguide 110A.

In this way, even if the first substrate 110 and the second substrate 120 may be spaced from each other due to tolerances in the manufacturing process or mass production process, the loss value and/or the isolation value between ports are within the numerical range allowed in commercial products, so that the broadband transition structure 100 according to the present disclosure may be applied to wide-angle and wideband antennas.

Further, according to the broadband transition structure with mixed contact and non-contact protrusions 100 according to the present disclosure, there is a technical effect of broadening the operable frequency band compared to a transition structure where the height of the protrusions is constant.

The above description is only for one embodiment for implementing an exemplary broadband transition structure with mixed contact and non-contact protrusions according to the present disclosure. The present disclosure is not limited to the above embodiment. As claimed in the claims below, it is understood that the technical spirit of the present disclosure exists to the extent that various changes can be made by those skilled in the art without departing from the gist of the present disclosure.

What is claimed is:

1. A broadband transition structure with mixed contact and non-contact protrusions having a first substrate and a second substrate which are adjacent to each other and transmitting a radio wave through a waveguide, wherein the first substrate comprises: a flat first side;

a second side opposite to the first side;

a first waveguide provided between the first side and the second side;

a third side provided between the first side and the second side as a periphery of the first waveguide;

a fourth side connecting the first side and the third side;

a plurality of contact protrusions extending from the third side and contacting the second substrate; and a plurality of non-contact protrusions extending from the third side and non-contacting the second substrate.

2. The broadband transition structure with mixed contact and non-contact protrusions of claim 1, wherein the height of the contact protrusion is higher than the height of the non-contact protrusion.

3. The broadband transition structure with mixed contact and non-contact protrusions of claim 1, wherein the height of the contact protrusion is equal to the height of the fourth side, and the height of the non-contact protrusion is less than the height of the fourth side.

4. The broadband transition structure with mixed contact and non-contact protrusions of claim 1, wherein the contact protrusion or the non-contact protrusion is disposed within $\lambda/4$ from the first waveguide.

5. The broadband transition structure with mixed contact and non-contact protrusions of claim 1, wherein the contact protrusion or the non-contact protrusion is provided periodically or aperiodically on the third side.

6. The broadband transition structure with mixed contact and non-contact protrusions of claim 1, wherein the height of the contact protrusion or the non-contact protrusion is higher than $\lambda/4$.

7. The broadband transition structure with mixed contact and non-contact protrusions of claim 1, wherein the height difference between the contact protrusion and the non-contact protrusion is within ⅓ of the height of the contact protrusion.

* * * * *